March 7, 1944.　　J. MERCIER　　2,343,689
SLIDE VALVE
Filed July 23, 1942　　3 Sheets-Sheet 2
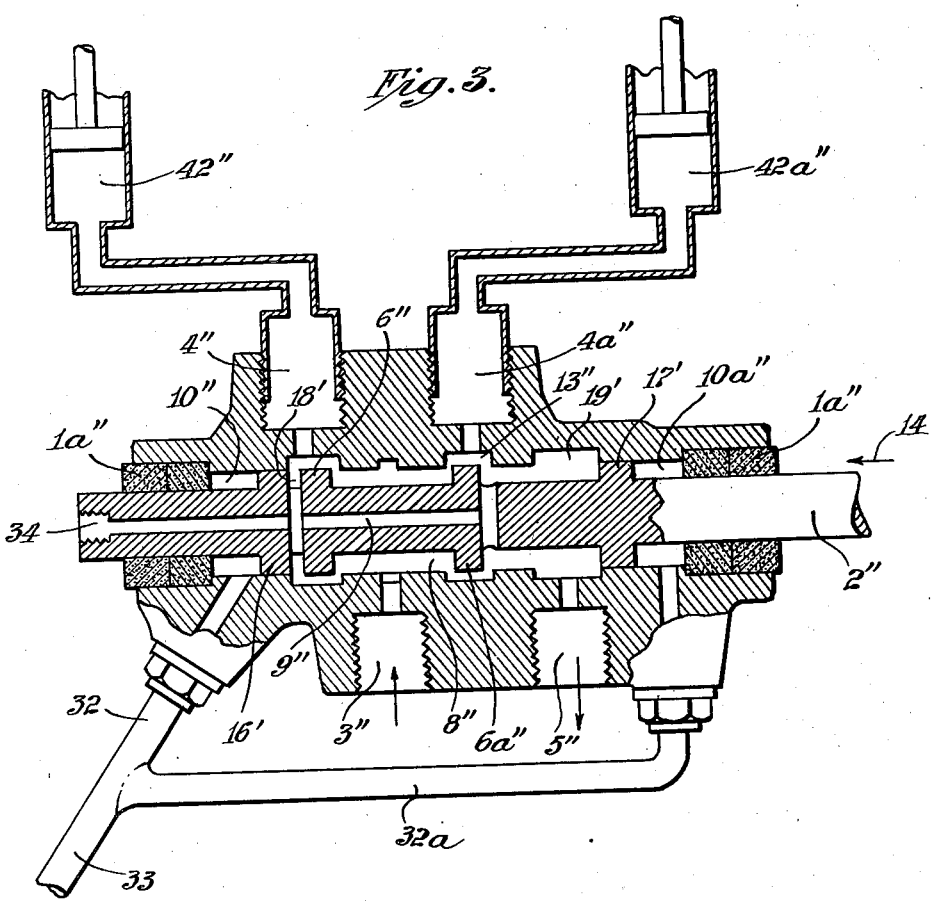
INVENTOR
JEAN MERCIER
BY Watson, Cole,
Grindle & Watson
ATTORNEYS March 7, 1944.  J. MERCIER  2,343,689
SLIDE VALVE
Filed July 23, 1942  3 Sheets-Sheet 3

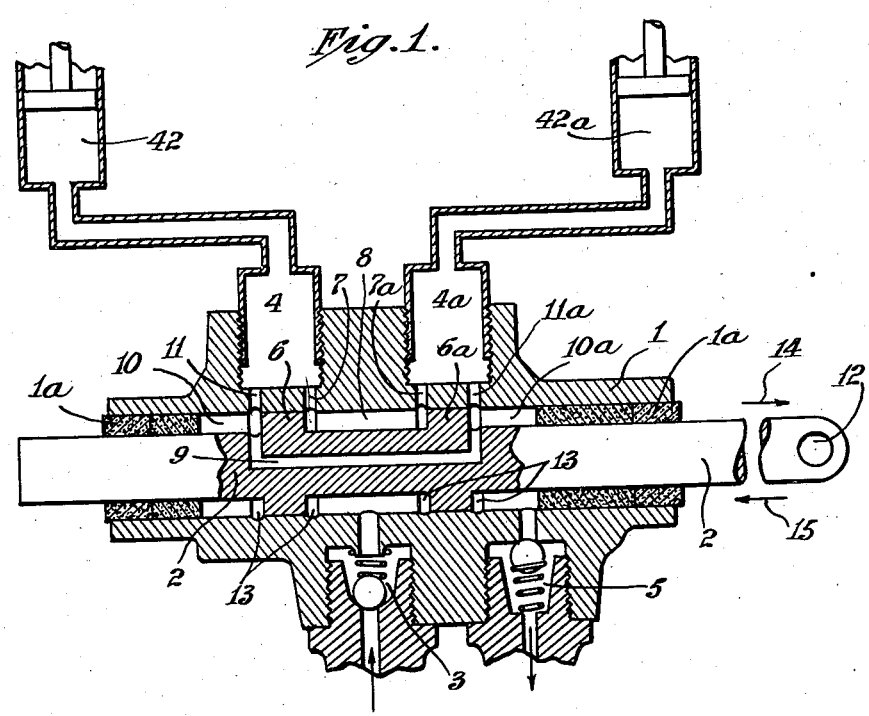

INVENTOR
JEAN MERCIER
BY Watson, Cole,
Grindle & Watson
ATTORNEYS

Patented Mar. 7, 1944

2,343,689

UNITED STATES PATENT OFFICE 2,343,689

SLIDE VALVE

Jean Mercier, New York, N. Y.

Application July 23, 1942, Serial No. 452,085

5 Claims. (Cl. 251—76)

My present invention pertains to slide valves which control fluid-actuated devices and more particularly to a slide valve designed to control two fluid-actuated devices or two groups of fluid-actuated devices which are to be operated in a predetermined manner.

In my copending application 203,849, filed April 23, 1938, now Patent No. 2,312,432, granted March 2, 1943, I have described a combination of elements including a master valve, a distributor valve and two fluid-actuated devices disposed in a machine, the distributor valve including a movable valve element operatively connected to the controls of said machine. This combination permits the automatic operation of two fluid-actuated devices in accordance with the operation of the general controls of the machine by the pilot and affords an automatic correction of the movement of the fluid-actuated devices whenever an incorrect or unbalanced condition of said machine occurs. The operation of the general controls, thus, produces, automatically a change in the flow of fluid to or from the fluid-actuated devices which corrects the unbalanced condition, bringing the units into a balanced relationship. If, on the other hand, the pilot operates the general controls to obtain a change in the working of the machine, the distributor valve will automatically cause the fluid-actuated devices to move so as to assist in the result desired by the pilot.

The distributor slide valve, according to my present invention, comprises a valve casing having at least two distributing ports and at least one supply and one exhaust port. Inside said valve casing, I provide a cylinder bore communicating through conduits and/or orifices with said ports, and a movable piston-like element slidably engaging the wall of said cylinder bore. Said movable valve element is provided with recessed portions forming annular chambers inside said casing surrounding the piston-like portions and so located and dimensioned with respect to said orifices that the valve will, in its neutral position, afford communication between the supply and discharge ports and both distributing ports. On the other hand, if said movable valve element is displaced from its neutral position, in one direction or the other, the effect will be to obstruct communication between one distributing port and the supply port without affecting the communication between the former and the exhaust port, while obstructing the communication between the other distributing port and the exhaust port without affecting the communication between the former and the supply port.

A further feature of my present invention is to provide means for equalizing the pressure exerted on said movable valve element axially and radially so that it can be easily displaced. To that end, annular recesses may be provided in said cylinder bore and the end portions of said cylinder bore may be made to communicate with each other by a suitable passage.

As an alternative, the valve may be constructed so as to be completely balanced only when the movable valve element is in its neutral position. When displaced from that position, the movable valve element will be subjected to progressively rising pressure in the axial direction, tending to force it back into its neutral position.

The slide valve according to my present invention is a distributor valve intended to be connected to a master valve, operated by independent means, which will control the admission of fluid under pressure from a suitable source or the exhaust of fluid under pressure to a reservoir or the like. According to the operation of the master valve, for which any suitable slide or rotary valve may be employed, fluid under pressure will be admitted to the distributor valve and through it in turn to the fluid-actuated devices or exhausted from the same through the distributor valve.

The slide valve according to the present invention serves, in its neutral position, merely as a passage between the fluid-actuated devices and the master valve so that the former will be uniformly operated according to the operation of the latter. However, when the slide valve is displaced in one direction or the other, then the fluid-actuated devices will be differentially operated.

Further features of the present invention may be apparent from the following description of embodiments thereof taken in connection with the accompanying drawings, wherein identical reference numerals are applied to identical parts in the several figures, and in which:

Figure 1 is a longitudinal section of a distributor valve,

Figure 2 is a longitudinal section of a modified distributor valve,

Figure 3 is a longitudinal section of another modification of the valve shown in Figure 2.

In all figures, the distributor valve is shown with the slidable valve element in its neutral position. Reference numerals with one or more primes indicate parts in modified embodiments corresponding to those designated by the corresponding numerals without prime in a preceding figure.

Figure 4:
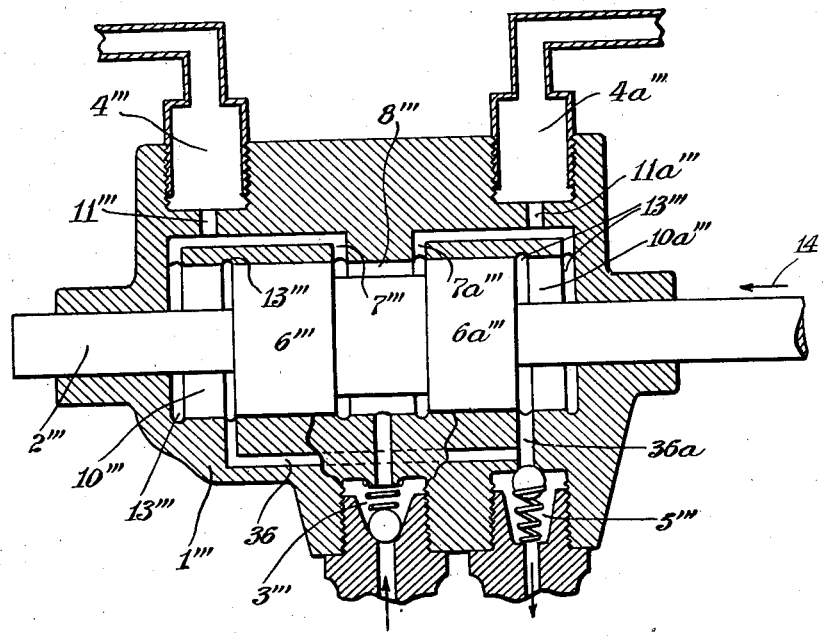
Figure 4 is a sectional view of another form of distributor valve.

In Figure 1, a valve casing 1 with a central cylinder bore contains a movable valve element 2 which is sealed at the ends by suitable packing devices 1a. The casing 1 has a supply port 3 and a discharge port 5, also two distributing ports 4 and 4a which are connected in turn to one side of two fluid-actuated devices 42 and 42a respectively. The valve element 2 has piston-like portions 6 and 6a which slidably engage the wall of said cylinder bore. In casing 1 there are provided orifices 7, 7a, 11 and 11a for communication between the distributing ports 4, 4a and the interior of said cylinder bore. There are two external annular chambers 10 and 10a and one central annular chamber 8 formed by the piston-like portions 6 and 6a, inside said cylinder bore. A passage 9 extends through the interior of said movable element 2 to connect the two external chambers 10 and 10a with each other.

The projecting end 12 of the slidable valve element 2, may be operatively connected to the general controls of a machine on which a pair of devices 42 and 42a are installed.

Ports 3 and 5 are intended to be connected to a suitable master valve which will afford means to connect alternatingly supply port 3 to a source of fluid under pressure and discharge port 5 to an exhaust line. Ports 3 and 5 may be connected to the master valve by one common conduit or by two separate conduits. If only one conduit is provided, then the check valves shown are required to prevent any inflow of fluid through port 5 or any outflow through port 3.

Figure 1 shows the distributor valve in its neutral position in which ports 4 and 4a are both in equal communication with ports 3 and 5. Accordingly an equal amount of fluid is supplied to or discharged from the hydraulic devices 42 and 42a. When element 2 is displaced in the direction of arrow 14, piston-like portion 6 will obstruct orifice 7, thereby obstructing communication between supply port 3 and distributing port 4. At the same time, portion 6a will close orifice 11a, thus obstructing communication between discharge port 5 and distributing port 4a. But, the communication between port 4 and port 5, through orifice 11, chamber 10, passage 9 and chamber 10a, will not be disturbed, nor will the communication between port 4a and port 3, through orifice 7a and chamber 8, be affected. Consequently, if the contemplated displacement of element 2 occurs at a time when port 3 is supplied with fluid under pressure, hydraulic device 42 will be shut off from further supply and will consequently stop moving, while device 42a will continue to be supplied and consequently continue moving. Inversely, if at the time port 5 is connected to the exhaust line, then device 42 will continue to be exhausted and consequently continue moving while device 42a will be stopped. In the event of a displacement of element 2 in the direction of arrow 15 in a similar manner, device 42a will be stopped and device 42 will continue moving if the distributor valve is connected to a supply line, and inversely device 42 will be stopped and 42a will continue moving if the distributor valve is connected to an exhaust line.

Connecting passage 9 distributes the pressure evenly between chambers 10 and 10a. Recesses 13 in the wall of the cylinder bore inside casing 1, which are disposed so as to extend circularly from and to communicate with orifices 7, 11, 7a and 11a, will evenly distribute any radial pressure to which element 2 may be subjected. By virtue of this structure, element 2 is axially as well as radially balanced and can be easily displaced.

Annular recesses 13 are shown only in connection with the orifices of the distributing ports because the stroke of element 2 is so limited that neither of the two piston-like portions 6 or 6a are able to close port 3. With a modified structure in which port 3 could be obstructed, it would be advantageous to provide an additional annular recess 13 in connection with the orifice of port 3.

The slide valve shown in Figure 2 is similar to that of Figure 1 but modified slightly by the addition of two supplementary piston-like portions 16 and 17 and two supplementary recessed portions forming two additional annular chambers 18 and 19. Ports 4' and 4a' communicate with the interior of the cylinder bore through one large orifice respectively instead of the two smaller ones in the case of Figure 1. Port 5' communicates with the interior of said cylinder bore through two orifices. Additional chambers 18 and 19 communicate with each other through passage 20 extending through the interior of the movable element 2'.

The structure of Figure 2 has the advantage that packing members 1a' are not subjected to pressure. Owing to the larger cross sectional area of orifices 7' and 7a' and to the duplication of the orifice in port 5', the effect of a displacement of element 2' will be very gradual, compared with the comparatively abrupt effect according to Figure 1.

Figure 3 shows a modification of the valve shown in Figure 2, which requires only one passage extending through the interior of element 2. This structure has the advantage that element 2 and accordingly the whole valve may have a smaller diameter. According to the structure shown in Figure 3, the external chambers 10" and 10a" are connected together by a conduit 32, 32a extending through the valve casing and the outside. This conduit may be connected through pipe 33 to a reservoir. In that case, liquid which enters chambers 10" and 10a" will be exhausted.

Passage 9" extending through the interior of element 2" may be prolonged to extend to a projecting end of element 2", where it may open to the outside as shown at 34. This will facilitate cleaning of the valve. Open end 34 will be closed by suitable means when the valve is in operation.

Another modification consists in providing only one orifice for the communication of each port with the interior of the cylinder bore but to surround each orifice with a relatively large recessed portion in the wall of the said cylinder bore. This permits of dispensing with passage 20.

The operation of the valve is similar to that of Figure 2 but differs in only one feature from the operation of the valves shown in the preceding figures. If movable valve element 2" is displaced in one or the other direction as far as possible then either port 4" will communicate with chamber 10" while being cut off from port 3 or port 4a" will communicate with chamber 10a" while being cut off from port 3". If chambers 10" and 10a" are connected through pipe 33 to the outside, this structure will afford a means to exhaust one of the hydraulic devices 42" or 42a", depending on whether element 2" is in its extreme left or right position while the distributor valve may continue to be supplied with fluid which will be delivered to the other of the hydraulic devices. The importance of this feature will be readily understood. If, for instance, when the distributor valve is connected to a source of fluid under pressure, device 42a" is slow in its movement and if the resulting disturbance leads to a displacement of element 2" in the direction of arrow 14, then the first effect will be to cut 42" off from further supply of fluid while 42a" continues to be supplied. Even though 42" is in communication with exhaust port 5", no fluid can escape because the distributor valve is at that time cut off from the exhaust line. With a valve according to Figure 1, the operator has no other choice but to maintain the valve in its position and to await whether the continued supply to the slower moving element 42a" will overcome the deficiency and bring it into line with device 42'", or to abandon the desired operation of devices 42" and 42a" altogether by returning the valve to its neutral position and connecting the same to the exhaust line so that both hydraulic devices are exhausted and returned to their original position. The valve according to Figure 3 offers the additional facility that one of the hydraulic devices may be effectively discharged while the other continues to be supplied. Thus the operator does not rely on the effectiveness of further supply of fluid to the slow moving device alone, but he can restore both devices speedily to an identical position by placing the distributor valve according to Figure 3 in an extreme position, thus exhausting the device which is too far extended and allowing it to move backwards while the other may continue to move forward.

The valve according to Figure 4 is a modification of the valve shown in Figure 1. The main difference resides in the arrangement of passages 36 and 36a which replace passage 9 of Figure 1. Passages 36 and 36a extend through the interior of casing 1'" and are connected to the exhaust port 5'". The operation of the valve according to Figure 4 is substantially similar to that of Figure 1. However, when element 2'" is displaced from its neutral position, the communication between chambers 10'" and 10a'" will be obstructed. Consequently, further movement of element 2'" will not be possible except by compression of fluid in one of the hydraulic devices. The resulting rise in pressure will tend to force element 2'" back to its neutral position.

Figure 5:
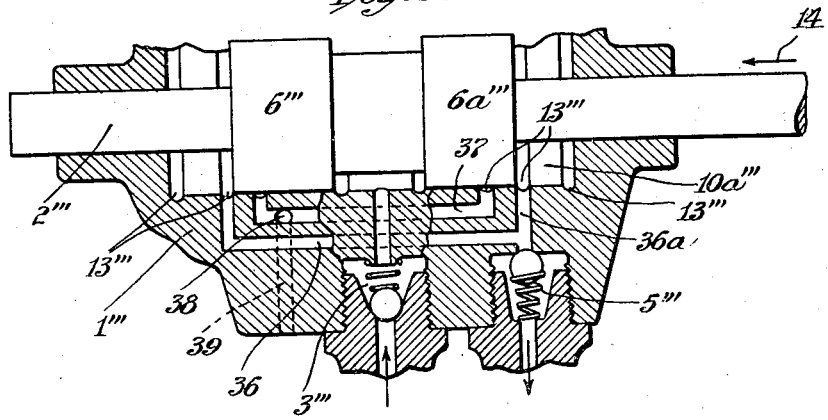
Figure 5 shows a partial sectional view of the valve shown in Figure 4.

Figure 5 shows a partial sectional view of a modification of the valve of Figure 4. Only the lower half of the valve is shown, since the upper portion is identical to that of Figure 4. The structure of Figure 4 is changed by the addition of passages 37 and 39. Passage 37 connects two ports of the cylinder bore inside casing 1" so located that the orifices of passage 37 are obstructed by piston-like elements 6'" and 6a'" when element 2'" is in its normal position. However, when element 2'" is displaced to an extreme position in one or the other direction, one of the orifices of passage 37 will be uncovered and consequently either port 4'" or port 4a'" will be connected to passage 37. Passage 39 is connected at 38 to passage 37 and places the latter in communication with the outside. Consequently, whenever element 2'" comes into an extreme position, then either port 4'" or port 4a'" will be connected to an exhaust line while the other port will remain in communication with supply port 3'". The details of this operative feature are the same as explained in connection with Figure 3. Consequently the vlave shown in Figure 5 also permits one of the hydraulic devices to be exhausted while the other may continue to be supplied with fluid under pressure.

The present description is not intended to limit my present invention which extends to all changes, modifications and equivalents comprehended within the scope of the appended claims.

What I claim is:

1. A slide valve for distribution of fluid to two hydraulic devices which comprises a valve casing, a cylinder bore in said casing, one inlet and one outlet and two distributing ports in said casing, each communicating with said cylinder bore through at least one orifice, a movable valve element inside said casing having four piston-like portions slidably engaging the wall of said cylinder bore and five recessed portions forming two external chambers, two intermediary chambers and one central annular chamber inside said cylinder bore, both external chambers communicating with each other through a passage and both intermediary chambers communicating with each other through a second passage, means to control the position of said movable valve element from the outside, and means to connect said first mentioned passage to the outside, said movable valve element being adapted to afford, in its neutral position, communication between said inlet and outlet ports and said distributing ports while obstructing said first mentioned passage and to restrict, when displaced from its neutral position, the communication between one of said distributing ports and said inlet port without affecting the communication between the former and said outlet port while also restricting the communication between said outlet port and said second distributing port without affecting the communication between the latter and said inlet port, and to afford when further displaced from its neutral position, communication between said one distributing port and one of said external chambers without affecting the condition of said second distributing port.

2. A slide valve for distribution of fluid to two hydraulic devices which comprises a valve casing, a cylinder bore in said casing, one inlet and one outlet port in said casing, each communicating with said cylinder bore, respectively, two distributing ports in said casing, each communicating with said cylinder bore, a movable valve element inside said casing having at least two piston-like portions slidably engaging the wall of said cylinder bore and at least three recessed portions forming at least two external and one central annular chambers inside said cylinder bore, said two external chambers communicating with each other through a passage, a second passage extending between two openings in said cylinder bore obstructed by said movable valve element when the latter is in its neutral position, means to connect said second mentioned passage to the outside, and means to control the position of said movable valve element from the outside, said movable valve element being adapted to afford, in its neutral position, communication between said inlet and outlet ports and said distributing ports and to restrict, when displaced from its neutral position, the communication between one of said distributing ports and said inlet port without affecting the communication between the former and said outlet port while also restricting the communication between said outlet port and said second distributing port without affecting the communication between the latter and said inlet port, and to afford, when further displaced from its neutral position, communication between said one distributing port and said second mentioned passage without affecting the condition of said second distributing port.

3. A slide valve according to claim 1 in which said first mentioned passage extends through said casing and the outside, said second mentioned passage extending through the interior of said movable valve element to one end thereof.

4. A slide valve according to claim 2 in which each of said distributing ports communicates with said cylinder bore through a pair of orifices, annular recesses being formed in the wall of said cylinder bore to extend circularly from and to communicate with each of said orifices.

5. A slide valve according to claim 2 in which both said passages extend through said casing.

JEAN MERCIER.